OR    3,984,171

United Sta
Hotchkiss

[11] 3,984,171
[45] Oct. 5, 1976

[54] LINEAR SCAN SYSTEM
[75] Inventor: Robert N. Hotchkiss, Ridgefield, Conn.
[73] Assignee: Image Information Inc., Danbury, Conn.
[22] Filed: Aug. 21, 1974
[21] Appl. No.: 499,130

[52] U.S. Cl. .................................. 350/7; 350/293
[51] Int. Cl.² ................................ G02B 27/17
[58] Field of Search ............... 350/6, 7, 285, 293, 350/284; 356/24, 167, 203; 178/7.6

[56] References Cited
UNITED STATES PATENTS
3,790,246   2/1974   Pickering ...................... 350/7
3,881,801   5/1975   Bechtold ....................... 350/7

Primary Examiner—John K. Corbin
Assistant Examiner—Richard A. Rosenberger
Attorney, Agent, or Firm—Hubbell, Cohen, Stiefel & Gross

[57] ABSTRACT

A system for providing a vertically and horizontally defined continuous linear scan of predetermined length of an incident light source output, such as from a coherent light source, such as a laser, in a predetermined focal plane, wherein the incident light source is initially focused to form a scanning spot before deflection with the inherently curved scan locus associated with this deflected scanning spot being straightened to provide the continuous linear scan by means of a non-planar reflecting compensator, such as a spherical reflecting surface chordal segment. The focused scan spot is initially deflected, such as by a conventional oscillating single plane member or a conventional rotating multifaceted reflector which has been tilted at a predetermined offset angle from the optical axis between the incident light source output and the initial deflector to cause the focused light spot to inpinge upon the spherical chordal segment at an intercept point offset below the virtual center of the spherical surface capable of providing the spherical chordal segment, this intercepted spot being reflected to provide the continuous linear scan of predetermined length in the focal plane, such as on a record medium located therein. The oscillating mirror or rotating multifaceted reflector causes the focused spot to traverse the record medium to provide the linear scan and, movement of the record medium perpendicular to the focused spot traversing linear scan provides an area scan of the record medium. The system may be employed, by way of example, in a straight line galvo recorder in which the scanning plane mirror and folding mirror optics may be utilized or in a straight line spinner scanner in which a multifaceted reflector and folding mirror optics may be utilized. An optical reader may be utilized in conjunction with the system for reading the linear scan.

16 Claims, 6 Drawing Figures

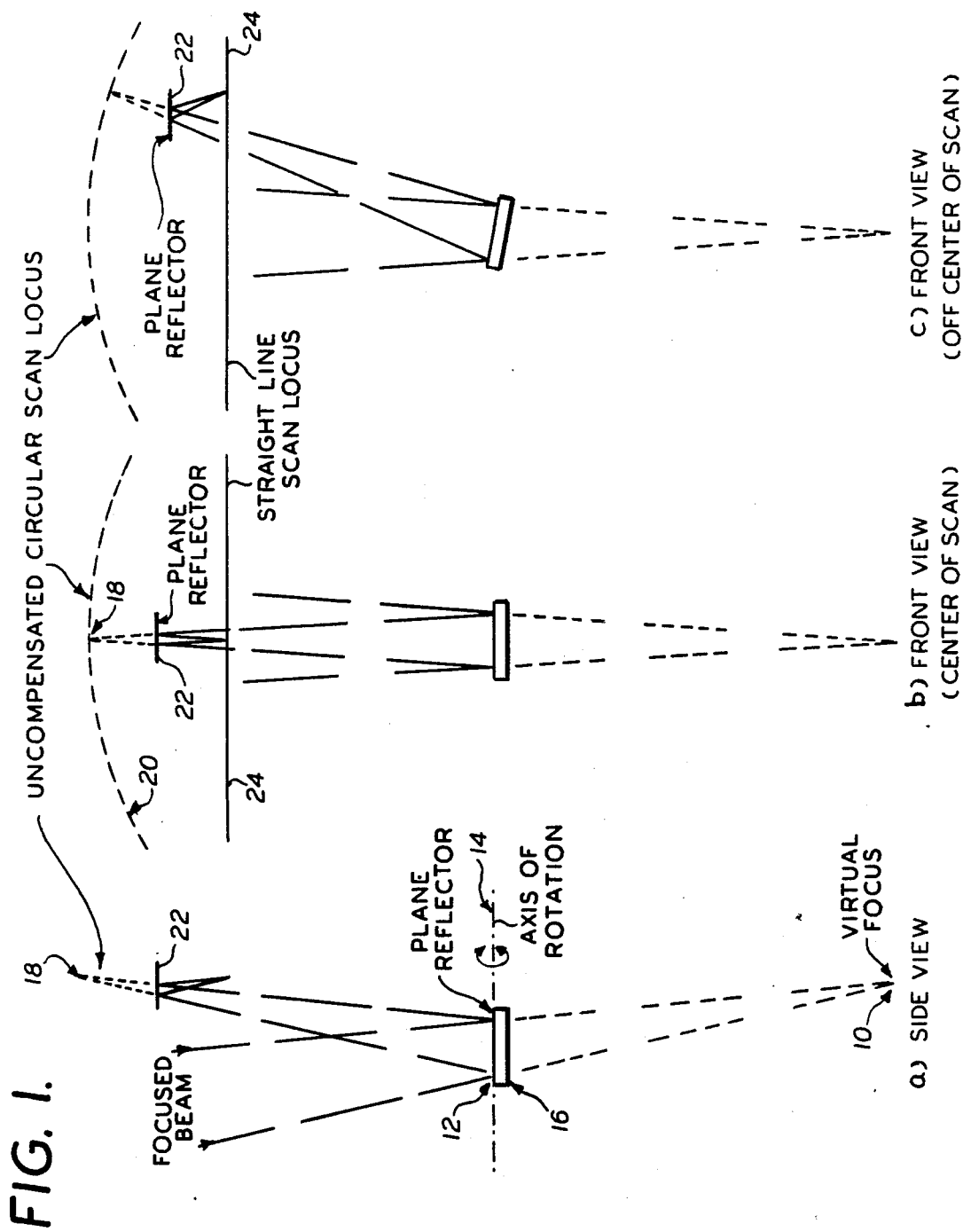

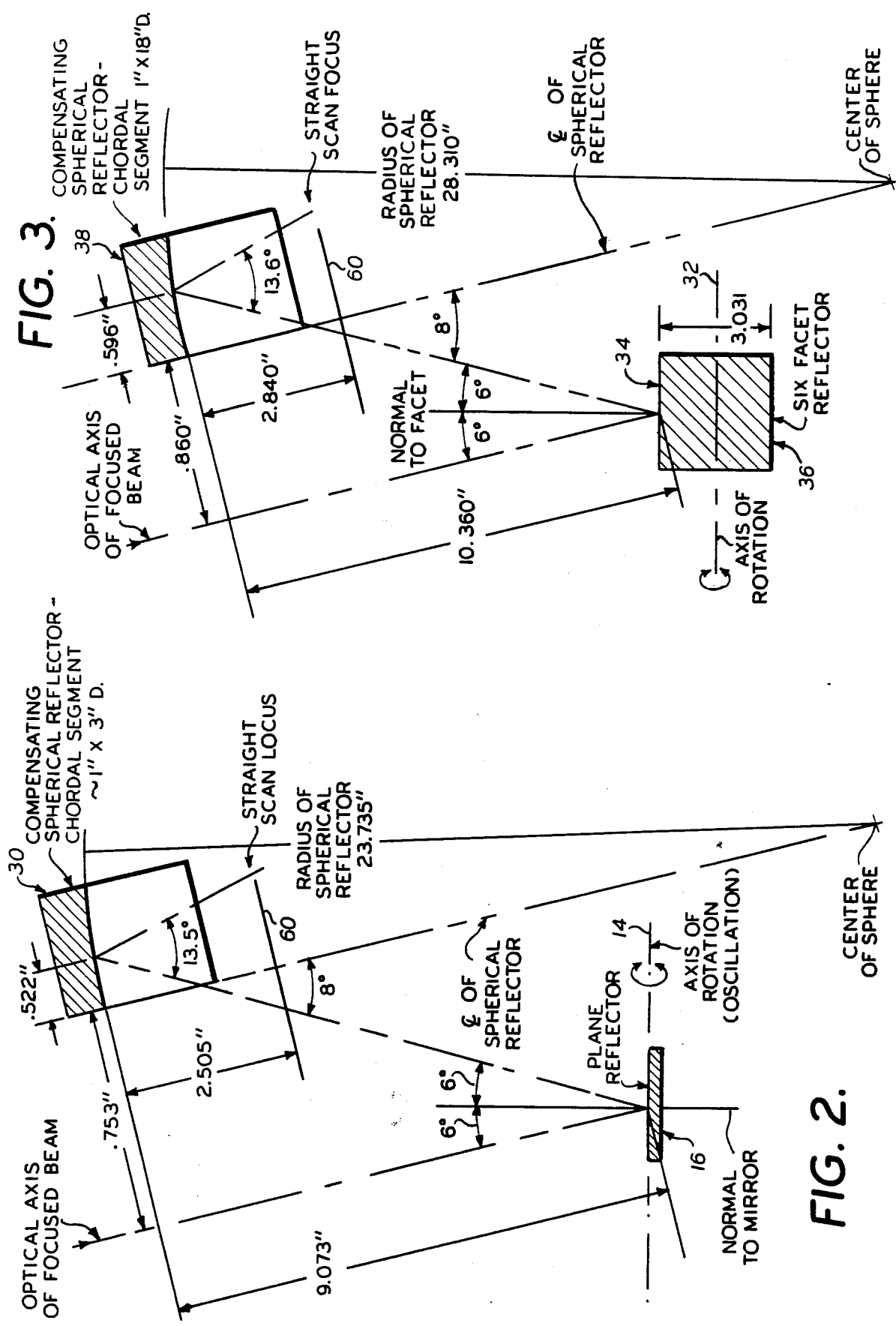

LINEAR SCAN SYSTEM

BACKGROUND OF THE INVENTION

1. Field of the Invention

The present invention relates to scanning systems and more particularly to such systems capable of providing a linear scan.

2. Description of the Prior Art

In many scanning and recording applications, it is required that the scan record spot move in a straight line with essentially constant velocity. Such a requirement is particularly important when the rigidity or other characteristics of either the scanned material or the recording medium preclude any bending. The conventional prior art approach to such straight line scanning is one utilized in nearly all scanning microdensitometers. In such prior art devices, a small spot of light is formed by a microscope type of optical system and is caused to traverse the material being scanned either by movement of the spot forming optical assembly or by movement of the material being scanned with the optical assembly. However, this prior art approach is limited to applications which can be satisfied with a relatively low scan velocity, such as a few inches per second, because of inertial effects which are present at the beginning and end of the scan. In an attempt to eliminate such inertial effects, prior art straight line scanners and recorders have utilized flying spot cathode ray tubes in which the moving spot on the cathode ray tube phosphor is reimaged optically on the surface being scanned. However, such flying spot scanners are limited by the finite size of the spot on the phosphor and the usable cathode ray tube diameter. In an effort to extend this limit, multiple cathode ray tube configurations have been utilized resulting in a complex system. In addition, in such prior art flying spot scanning systems, the radiance of the flying spot is relatively low requiring, in recording applications for example, high sensitivity photographic material. Because of these limitations, most high speed scanning/recording systems which require a small spot of high brightness conventionally utilize a rotating or oscillating mirror surface to cause the deflection of the spot forming beam which is provided either by an incoherent source, such as a tungsten lamp, or a coherent source, such as a laser, in which increased image brightness may be obtained.

Rotating multifaceted reflectors are utilized in prior art high speed applications to normally avoid the time required for an oscillating reflector to stop, start and possibly retrace between scans, these prior art rotating reflectors either being prismatic in which all reflecting faces are parallel to the axis of rotation, or pyramidal in which the reflecting faces are at an angle to the axis of rotation. In either of these cases, the number of faces is normally determined by the geometrical requirements of the scan/record system. The reflecting face in such prior art systems may either be overfilled or underfilled by the imaging radiation. In the instance when the reflecting face is overfilled, the boundary of the face is the aperture stop of the system, such overfilling usually resulting in less efficient use of available light particularly when laser sources are utilized, overfilling being generally utilized, however, when duty cycles approaching 100% are required. In the instance when the reflecting face is underfilled, the aperture stop of the system is normally determined by some other external obstruction. Furthermore, in such prior art scanning/recording systems, the reflecting face is normally located in either collimated or focussed space. If the reflection takes place in collimated space, the subsequent spot forming optics operate over the full scan angle; however, if the beam is focused before deflection, the prior optics operate in an on-axis condition enabling a simpler optical design than required for operation in collimated space. However, in such prior art prefocusing systems, the deflection occurring after focusing results in the locus of the scanning spot being inherently curved as opposed to the desired straight line or linear scan.

In an attempt to overcome this problem in prior art systems employing prefocusing, the scanned surface and/or recording medium must be cured on to a cylindrical type of surface, such as the system disclosed in U.S. Pat. No. 2,853,918, and is not satisfactory for providing a straight line or a linear scan when the scan surface or record medium is in a flat plane. In addition, in attempting to compensate for the curved scan, such as in a laser scanning system, to provide a flat plane scan, prior art systems have employed parabolic compensating mirrors in which corrections for distortions due to vertical non-linearity are provided, such as the type of system disclosed in U.S. Pat. No. 3,441,949. However, such prior art systems do not provide compensation for horizontal nonlinearity and distortions still exist, therefore, in curvature of scan in the horizontal plane. Another elaborate prior art compensating system which has not proved satisfactory is disclosed in U.S. Pat. No. 3,469,030 in which field flattening lenses are utilized in conjunction with a beam splitter to compensate for optical displacement inherently caused by the beam splitter. These disadvantages of the prior art are overcome by the present invention.

SUMMARY OF THE INVENTION

A system for providing a vertically and horizontally defined continuous linear scan of predetermined length of an incident light source output, such as from a laser, in a predetermined focal plane in which prefocusing of the light beam before deflection is provided and the resultant inherently curved scan locus is straightened with a single non-planar reflecting compensator, such as a spherical reflecting surface chordal segment which intercepts the reflected scan spot curvilinear scan at a point offset below the virtual center of a spherical surface capable of providing the chordal segment, wherein the spherical chordal segment is offset a predetermined distance from the initial optical axis provided between the light source and the initial reflecting surface which reflecting surface is angled at a predetermined offset angle from this optical axis to intercept the spherical cordal segment with the deflected beam. In this arrangement, the spherical chordal segment becomes a compound toric surface which produces a varying signal power of the correct sign required to provide a straight line or linear scan on the focal plane from the inherently curvilinear scan locus provided by the initially deflected beam. The initial reflecting planar surface, which may be a single plane mirror oscillatably rotatable about an axis of rotation or a multifaceted polygonal reflector completely rotatable about an axis of rotation, provides the vertically and horizontally defined reflected continuous curvilinear scan of the incident light source in an initial scan plane for the predetermined scan length. Conventional focusing lens means are disposed along the optical axis between the incident light source and the rotatable reflecting planar surface for focusing the incident light source output as a spot on the reflecting planar surface.

A first order of approximation of the radius of curvature R associated with the spherical chordal segment is found by the equation $R = r \sin \theta/2 / \sin \phi/2$ where $r$ is the radius of the locus of scan of the initial reflecting planar surface, the linear scan length is defined by W and defines a chordal segment intersecting the locus of scan of the initial reflecting planar surface at the end points of the scan length with the radius $r$ and the radius R extending to one of the end points and making an angle of $\theta/2$ and $\phi/2$, respectively, with a line normal to and bisecting the length of the scan chordal segment, with $\theta$ being the conventional scan angle for the initial reflecting planar surface and with $\phi$ being the offset scan angle of the spherical chordal segment, with the offset angle initially controlling the provision of the linear scan. The linear scan providing optics may be employed in a straight line galvo recorder in which folding mirror optics may be utilized between the incident light source output and the initial single plane mirror reflecting surface which is oscillatably rotated by a galvanometer motor to provide a straight line laser recording, by way of example, or in a straight line spinner scanner where a motor and tachometer may be utilized to rotate a six facet reflector in which folding mirror optics, as discussed above, may be utilized, to provide a straight line or linear scan locus which may be optically read and converted into an analog signal by conventional means, such as fiber optics and photomultiplier tubes, such as for use with a laser beam scanner.

BRIEF DESCRIPTION OF DRAWINGS

FIG. 1 (a, b and c) is a diagrammatic illustration of the compensation principle of the present invention;

FIG. 2 is a diagrammatic illustration of the preferred optical arrangement of a single plane mirror scanner constructed in accordance with the present invention;

FIG. 3 is a diagrammatic illustration of the preferred optical arrangement of a six faceted mirror scanner constructed in accordance with the present invention;

DETAILED DESCRIPTION OF THE PREFERRED EMBODIMENT

Figure 4:
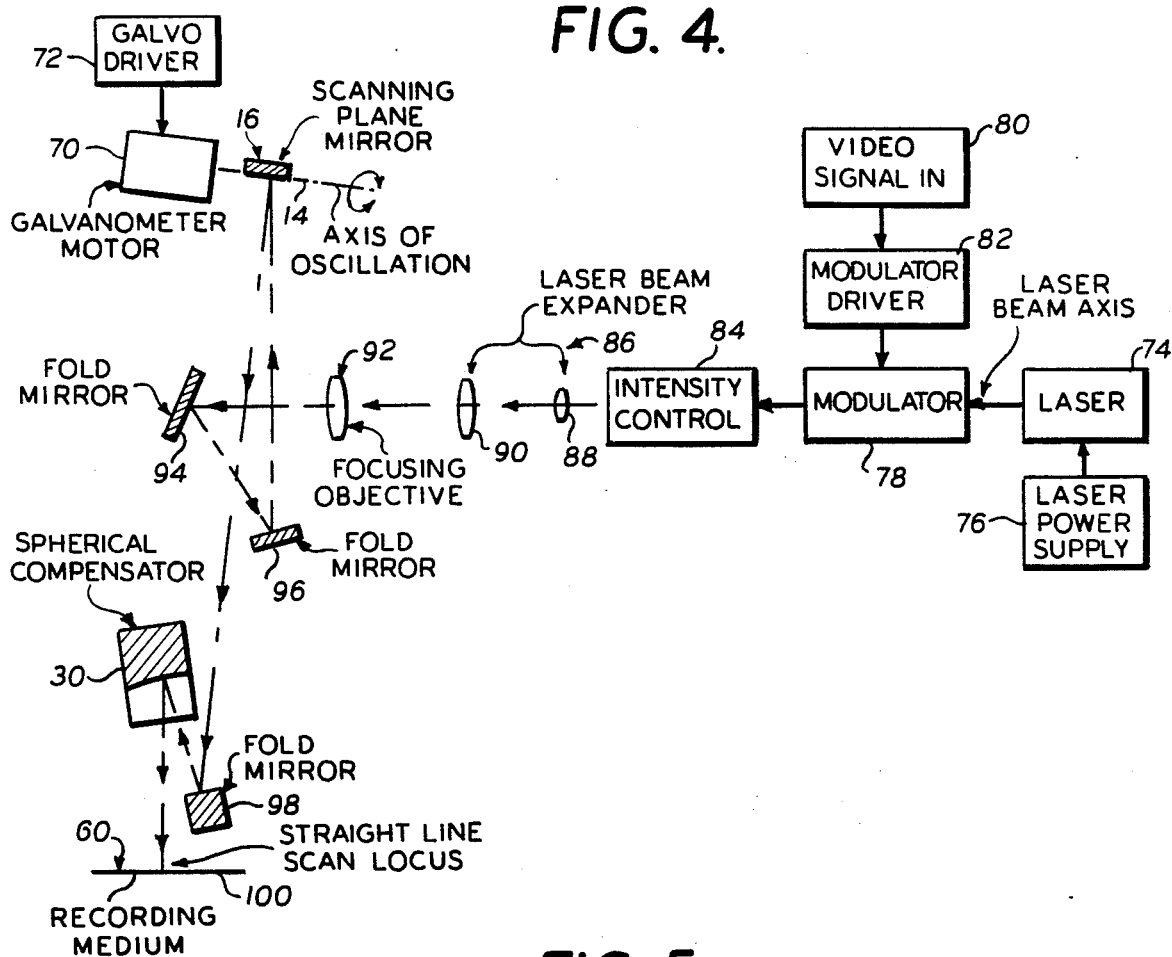
FIG. 4 is a diagrammatic illustration, partially in block of the optical schematic of a preferred straight line galvo recorder in accordance with the present invention.

Referring now to the drawings in detail and initially to FIG. 1 thereof, the preferred compensation concept or principle of the present invention for providing a straight line or linear scan in a flat focal plane is shown. As shown and preferred in FIG. 1a, a beam of light, which has preferably been focused to converge to the virtual focus 10 illustrated in FIG. 1a, is preferably reflected from a conventional plane mirror 16 reflecting surface 12 which is preferably rotated about an axis 14 in its surface 12, such as by a conventional galvonometer oscillating motor, by way of example. As this reflector 16 and, correspondingly, reflecting surface 12, rotates about axis 14, the focus point 18 associated with this reflected incident prefocused beam travels in a circular arc 20 concentric with the axis of rotation 14 of the reflector 16. In accordance with the present invention, for any individual point in this scan 20 there exists a position for a plane reflector, such as reflector 22 illustrated in FIGS. 1a, 1b and 1c, with FIG. 1b being the front view for the center of the scan position, which would cause the reflected focus spot 18 to be located on an arbitrary straight or linear scan line focus 24, with plane reflector 22 compensating for the circular scan locus 20 normally provided at each of these points and reflecting this initially reflected spot 18 to a predetermined focal plane to provide the straight line or linear scan locus 24 in this focal plane. FIG. 1b illustrates the location of such a plane reflector 22 for the center of the scan (FIG. 1b) and for some arbitrary position off the center of the scan (FIG. 1c) for the same front view of the system. Each scan point would, however, require a different location of the plane reflector 22 and, accordingly, such an arrangement is not utilizable for applications requiring a continuous linear scan. Accordingly, as will be described in greater detail hereinafter, preferably a single simple spherical surface of appropriate radius which is properly located with reference to the uncompensated curvilinear scan locus is utilized to provide the desired straight line or linear continuous scan. As will be described in greater detail with reference to FIG. 2 such a preferred straight line or linear scan locus is preferably provided for a truly circular uncompensated locus with the preferred spherical compensator 30, for a single plane mirror scanner where the axis of rotation 14 is in the plane of the reflector 16, as well as for a non-circular uncompensated locus resulting when the axis of rotation 32 is not in the plane of the reflecting surface 34, as is the case with a multifaceted rotating reflector 36 illustrated in FIG. 3 where the preferred spherical compensator 38 is utilized in a, by way of example, six facet mirror scanner.

Figure 6:
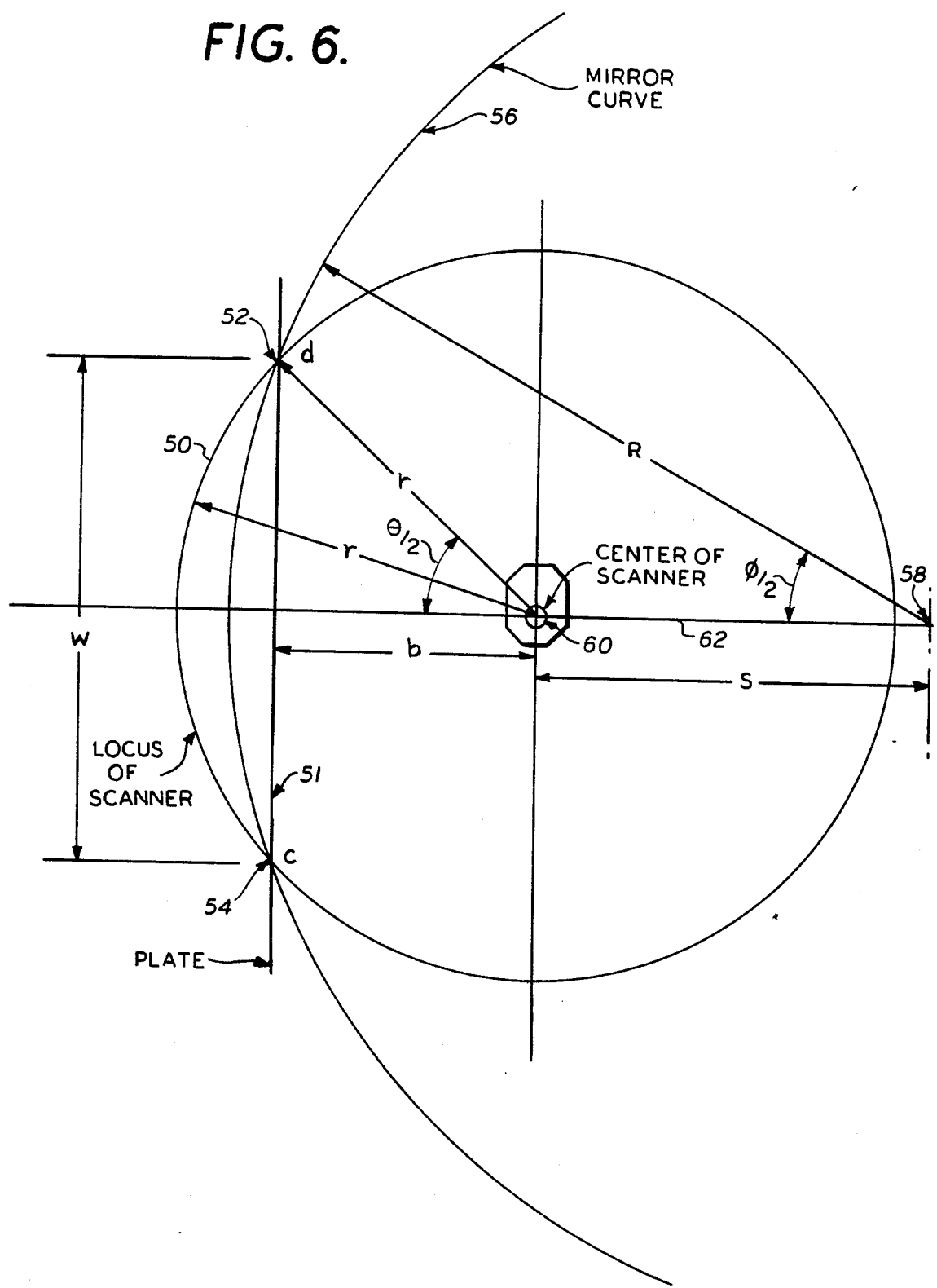
FIG. 6 is a graphic illustration utilizable in conjunction with a discussion of the first order approximation of the parameters associated with the preferred compensation principle of the present invention.

Before describing the preferred optical system arrangements of FIGS. 2 and 3, the derivation of the radius of curvature of the preferred spherical compensator 30 (FIG. 2) or 38 (FIG. 3) will be described in greater detail with references to FIG. 6. Referring now to FIG. 6, the locus of the scanner, whether it be the plane reflector 16 or the multifaceted reflector 36 is illustratively shown in FIG. 6 as having a circular arc locus of scan 50 which intercepts the end points of the focal plane and the flat plate or record medium to be scanned at points 52 and 54. The mirror curve 56 defining the radius of curvature R of the spherical surface compensator 30 also intersects end points 52 and 54 and has its center 58 displaced a linear distance S from the center 60 of the scanner providing the circular locus of scan 50 along a center of scan line 62 bisecting the plane extending between end points 52 and 54. As shown in FIG. 6, the center of scan 60 is located a lineal distance b from the focal plane or plate 51. As illustratively shown in FIG. 6; the linear continuous scan length, which is defined between end points 52 and 54 is represented by the letter W which defines a chordal segment intersecting the arc locus 50 of scan and the mirror curve 56. The radius of curvature R of the spherical surface providing mirror curve 56 makes an angle of $\phi/2$ with axis 62 with $\phi$ being the offset scan angle of the spherical reflecting surface 30, and the radius r providing the locus of scan 50 makes an angle of $\theta/2$ with axis 62. Thus, the length of scan W defined by the expression $2r\sin\theta/2$ and by the expression $2R\sin\phi/2$ at either of the end points 52 or 54 of the scan, where $\sin\theta/2$ equals $W/2r$ and $\sin\phi/2 = W/2R$ at points 52 and 54. Thus, for a first order approximation of the radius of curvature of the spherical reflecting surface compensator 30, R, is equivalent to $r\sin\theta/2/\sin\phi12$, providing a first order approximation in which the locus of the scanner is a limicon. This information may be processed in conventional fashion, such as through a conventional programmed general purpose digital computer, which, by conventional successive approximation will develop the optimum offset angle and radius of curvature for the spherical reflecting surface compensator 30, as well as the relative locations of the various optical elements comprising the preferred system of the present invention, such as illustrated in FIGS. 2 and 3, by way of example, to provide the desired continuous linear scan length.

Referring now to FIG. 2, an example of the preferred single plane mirror scanner constructed in accordance with the present invention is shown for providing compensation in accordance with the present invention for the circular scan locus of a plane reflector 16 to provide a straight line scan locus of, by way of example, 8.5 inches in length in focal plane 60. In the example of FIG. 2, the optical arrangement which is provided and was experimentally tested was diffraction limited (Rayleigh criterion) for a focused beam of F/16 and departed from straightness by less than 0.005 inches over the 8.5 inch scan length, the scan position being linear relative to the angle of deflection to better than 1% in the experimental example of FIG. 2. As shown in the experimental example of FIG. 2, at the center of the linear scan, R equals 23.73 inches, W equals 8.5 inches, the oscillating rotation of the plane deflector 16 is equivalent to plus or minus 12.5° of galvonometer deflection, the spherical chordal segment intercept point was offset 0.52 inches below the virtual center of the spherical surface capable of providing chordal segment 30, this virtual center being 2.50 inches from the focal plane 60, the center of the plane reflector 16 being disposed 9.07 inches along the optical axis of the focused beam from the location of the plane of the spherical surface virtual center, the center line associated with the spherical surface being spaced 0.75 inches from the optical axis of the focused beam, the offset angle of the plane reflector 16 being 12° comprising an incident offset angle of 6° and an angle of reflection of 6°, and with the angle formed by an intersection of the center line with the spherical reflector and the path of reflection between plane reflector 16 and the spherical chordal segment intercept point being 8°, the chordal segment 30 preferably being 1 inch long and 9 inches in diameter, all of the above values being approximate to two decimal places.

Referring now to FIG. 3, an experimental example of a six faceted mirror scanner constructed in accordance with the present invention is shown with values being provided relative to the center of the scan for a facet deflection of 40° total and a scan length, by way of example, of 16 inches in focal plane 60. Thus, by way of example, polygonal reflector 36 in the experimental example illustrated in FIG. 3, has opposed reflective faces spaced 3.03 inches apart and, at the center of the linear scan, R is equal to 28.31 inches, W equals 16 inches, the spherical chordal segment intercept point is offset 0.59 inches below the virtual center of the spherical reflector spherical surface capable of providing chordal segment 38, the virtual center being 2.84 inches from the focal plane 60, the center of the reflective face 34 receiving the incident light output being disposed 10.36 inches along the optical axis of the focused beam from the location of the plane of the virtual center of the spherical reflectors 38, the center line of the spherical reflector being spaced 0.86 inches from the optical axis of the focused beam, the offset angle of polygonal reflector 36 being 12° and comprising a 6° incident offset angle and a 6 degree angle of reflection, the angle formed by an intersection of the center line of the spherical reflector with the path of reflection between reflecting surface 34 and the spherical chordal segment 38 intercept point being 8°, and with the chordal segment 38 being preferably 1 inch long and 18 inches in diameter, all of the above values being approximate to two decimal places. The arrangement illustrated in FIG. 3 for a six faceted mirror scanner is capable of producing a straight line scan locus 16 inches long having a departure from straightness and linearity and less than 0.005 inches over the 16 inch scan length.

As shown and preferred in FIG. 4, the linear scan providing system of the present invention, such as illustrated in FIG. 2 for a plane reflector 16 may preferably be employed to provide a straight line galvo recorder whose preferred optical schematic is illustrated in FIG. 4. Preferably, conventional plane mirror folding optics are utilized to aid in packaging and to make the straight line scan locus of the galvo recorder more accessible. As shown and preferred in FIG. 4, a conventional galvonometer type motor 70 is used to oscillate plane reflector 16 about the axis of oscillation 14 with the motor 70 being driven in conventional fashion by conventional galvo driver 72. The preferred straight line galvo recorder preferably utilizes a conventional laser 74 as a coherent light source with the collimated beam from the laser 74 being the illumination source. Preferably, the laser wavelength and power are selected to satisfy the requirements of the recording medium being utilized. If the recording medium is sufficiently sensitive, if desired, an incoherent source, such as an incandescent lamp, can be employed in place of the laser 74. Laser 74 is powered by a conventional laser power supply 76 and is provided to a conventional modulator 78 which modulates the laser beam in conventional fashion with the signal to be recorded, this signal, by way of example, being a video signal which is provided from a conventional video signal device 80 to a conventional modulator driver 82 which conventionally drives modulator 78 to modulate the laser beam. The required modulation can be accomplished in conventional fashion electro-optically or acousto-optically dependent on the system parameters such as video band width. As is well known, the modulation may be accomplished internal to the laser, if desired, and, accordingly, the external modulator 78 may then be omitted. The modulated laser beam output of modulator 78 then preferably passes through a conventional intensity control 84 which can preferably consist of a predetermined number of neutral density filters, a continuously varied neutral density strip, a rotating polarizer, or other conventional intensity control device, to limit the beam power, if this is required for the system. The modulated laser beam output from the intensity control 84 is then preferably expanded in a conventional laser beam expander 86 to the diameter required for the system and the focusing objective by an afocal telescopic system, by way of example, such as one comprising two positive lens elements 88 and 90 illustrated by way of example in FIG. 4. This expanded modulated laser beam is then preferably focused in conventional fashion by conventional focusing objective lens 92 together with the subsequent optics which comprise conventional folding mirrors 94, 96 and 98 and spherical compensator 30 to provide a continuous straight line scan locus on the recording medium 100 located in the focal plane 60. Oscillation of the galvonometer driven reflection mirror 16 causes the focused spot to traverse the recording medium 100 with continuous or intermittent motion of the recording medium 100 perpendicular to the recording spot travel by conventional means (not shown) resulting in an area scan.

Figure 5:
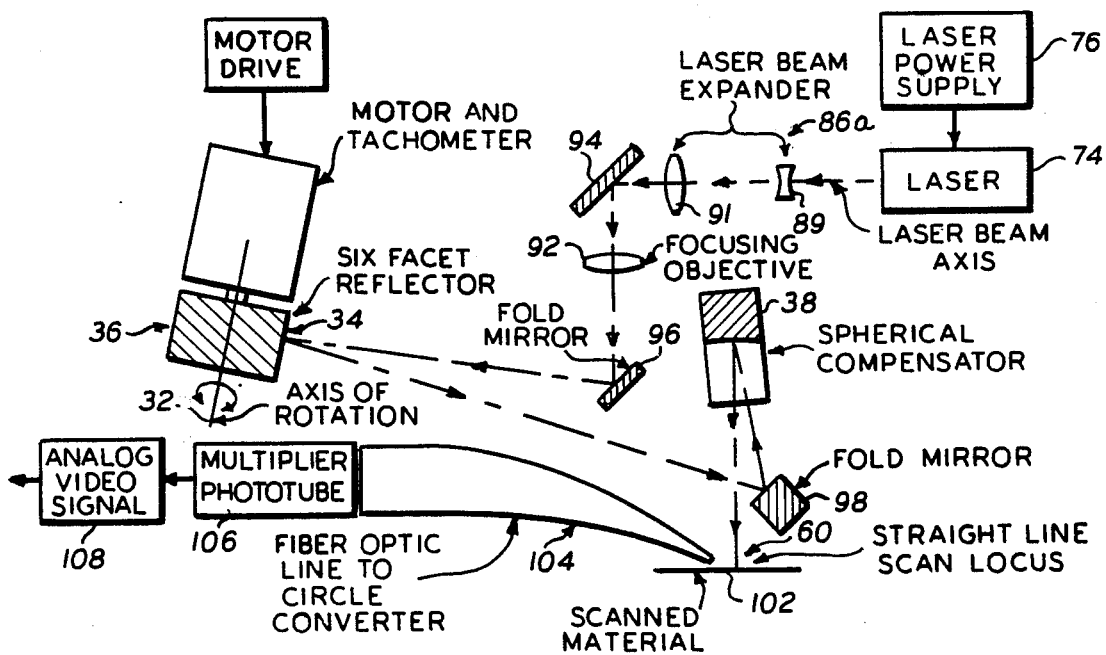
FIG. 5 is a diagrammatic illustration partially in block of the optical schematic of a preferred straight line spinner scanner constructed in accordance with the present invention.

Referring now to FIG. 5, the preferred optical schematic of a preferred straight line spinner scanner constructed in accordance with the present invention utilizing the system of FIG. 3 is shown. A multifaceted spinning reflector 36, which is preferably a six facet reflector is employed as the reflector. Since the arrangement illustrated in FIG. 5 is a scanner, there is no modulation requirement for the laser beam source 74, which, as previously described with reference to FIG. 4, may be an incoherent light source if the sensitivity of the reflected light detector is such as to enable scanning by an incoherent light source. As with the arrangement of FIG. 4, the laser beam 74 is preferably expanded in conventional fashion by laser beam expander 86a to the diameter required at the focusing objective, such as by an afocal telescopic system comprising negative lens element 89 and positive lens element 91, which expanded beam is folded by conventional folding mirror 94 and then focused by focusing objective lens 92 together with the subsequent optics comprising folding mirror 96, reflector 36 (by means of an optically aligned reflecting face 34 thereof), folding mirror 98 and spherical compensator 38 on to the scan material 102 being scanned to provide a continuous straight line scan locus on the scanned material 102. A conventional collecting means is provided to convert the variations in reflectivity of the scanned material 102 preferably into an analog signal, such as an analog video signal assuming the information being scanned is video information. This may preferably be accomplished in the manner illustrated in FIG. 5 by a conventional fiber optic bundle 104, one end of which has the fibers arranged in a long narrow line close to the linear scan locus with the other end having the fibers preferably arranged in a circular configuration to match the diameter of a conventional end on multiplier phototube 106 whose output is the analog video signal 108. If desired, other collection schemes, such as the use of a long strip photosensor close to the scan line may be utilized. As previously described with reference to the system of FIG. 4, rotation of the reflector 36 causes the focused spot to traverse the scanned medium 102 while continuous or intermittent motion of the scanned medium 102 perpendicular to the scanning spot travel by conventional means (not shown) results in an area scan.

Accordingly, by utilizing the preferred double offset system of the present invention, a spherical compensator which is offset a predetermined distance from the optical axis of the focused beam has an offset beam intercept point a predetermined distance below the virtual center of the spherical surface, provides a compound toric surface which produces a varying angle power of the right sign to straighten the inherently provided curvilinear scan for providing a continuous linear scan in the focal plane, such as in a laser scan system.

What is claimed is:

1. A system for providing a vertically and horizontally defined continuous linear scan of predetermined length of an incident light source output in a predetermined focal plane, said system comprising a first reflecting planar surface in optical alignment with said incident light source output along a first optical axis defined therebetween for intercepting said incident light source output and reflecting it therefrom, said first reflecting planar surface being rotatable about an axis of rotation for providing a vertically and horizontally defined reflected continuous curvilinear scan of said incident light source output in an initial scan plane for said linear scan length; means disposed along said first optical axis between said incident light source and said first rotatable reflecting planar surface for focusing said incident light source output as a spot on said first reflecting planar surface; and a continuous spherical second reflecting surface chordal segment having a portion thereof disposed along a second optical axis spaced apart from said first optical axis with said second optical axis being normal to said focal plane and extending through the virtual center of a spherical reflecting surface capable of providing said spherical second reflecting surface chordal segment, said spherical second reflecting surface chordal segment being disposed with respect to said second optical axis and said initial scan plane for intercepting said initial scan plane reflected curvilinear scan light source output at a pair of linearly spaced apart intercept points with one of said points of said spherical surface chordal segment being offset below said spherical reflectingsurface virtual center for providing said vertically and horizontally defined continuous linear scan for said linear scan length, said first rotatable reflecting planar surface having a circular arc locus of scan in said initial scan plane defined by a radius $r$ for said linear scan length, said linear scan length being defined by a linear distance W defining said linear spacing between said intercept points, said spherical reflecting surface having a radius of curvature defined by a radius R, said linear scan length W defining said spherical second reflecting surface chordal segment which chordal segment intercepts said circular arc locus of scan of said first reflecting planar surface at said intercept points, said intercept points defining a pair of end points of said linear scan length W, said radius $r$ and said radius R extending to said one intercept point and making an angle of $\theta/2$ and $\phi/2$, respectively, with a line normal to and bisecting said length of scan chordal segment, said spherical second reflecting surface radius of curvature R being defined by $R = r \sin \theta/2 / \sin \phi/2$, with $\theta$ being the conventional scan angle for said rotatable first reflecting planar surface for providing said circular arc locus of scan and with $\phi$ being the offset scan angle of said spherical second reflecting surface for providing said chordal segment intercept points, with said offset angle initially controlling the provision of said linear scan.

2. A system in accordance with claim 1 wherein said first rotatable reflecting planar surface comprises a planar reflecting mirror rotatable about said axis of rotation, said axis of rotation being disposed in the plane of said planar reflecting mirror.

3. A system in accordance with claim 2 wherein said rotatable planar reflecting mirror includes means for providing said rotation by oscillating said mirror about said axis of rotation to scan said light source output between said scan length end points.

4. A system in accordance with claim 3 wherein at the center of the linear scan R = 23.73 inches, W = 8.5 inches, said oscillating rotation comprises ± 12.5 degrees, said spherical chordal segment one intercept point is offset 0.52 inches below the virtual center of said providing spherical surface, said virtual center being 2.50 inches from said focal plane, said reflecting mirror center being disposed 9.07 inches along said first optical axis from the location of the plane of said providing spherical surface virtual center, said second optical axis being spaced 0.75 inches from said first optical axis, said first reflecting planar surface being disposed along said first optical axis at an incident offset angle of 6° between a normal to said planar reflecting surface and said first optical axis and said initial scan plane being disposed at an angle of reflection with respect to said normal equal to said incident offset angle and an angle formed by an intersection of said second optical axis and the path of reflection between said first reflecting surface and said spherical chordal segment one intercept point 8°, said chordal segment being 1 inch long and 9 inches in diameter, all of the above values being approximate to two decimal places.

5. A system in accordance with claim 2 further comprising a galvanometer motor means for oscillatably rotating said planar reflecting mirror about said axis of rotation to scan said light source output between said scan length end points and folding mirror means optically aligned with said oscillatable planar reflecting mirror and said spherical second reflecting surface chordal segment for reflectively directing said reflected curvilinear scan light source output in a predetermined optical path between said planar reflecting mirror and said spherical second reflecting surface chordal segment.

6. A system in accordance with claim 5 wherein said focusing means is disposed between said incident light source output and said planar reflecting mirror and said system further comprises a modulated coherent light source for providing said incident light source output, said focal plane containing a record medium which is linearly scanned by said modulated coherent light source output, whereby a straight line galvo recorder means is provided.

7. A system in accordance with claim 1 wherein said first rotatable reflecting planar surface comprises a multifaceted polygonal spinning reflector comprising a plurality of equiangularly adjacent planar reflecting faces rotatable about said axis of rotation, said axis of rotation being through the center of said polygonal reflector and being displaced thereby from the plane of the reflecting faces thereof.

8. A system in accordance with claim 7 wherein said rotatable polygonal spinning reflector includes means for providing said rotation by spinning said polygonal reflector completely about said axis of rotation to scan said light source output between said scan length end points.

9. A system in accordance with claim 8 further comprising folding mirror means optically aligned with said rotatable polygonal reflector and said spherical second reflecting surface chordal segment for reflectively directing said reflected curvilinear scan light source output in a predetermined optical path between said polygonal reflector and said spherical second reflecting surface chordal segment.

10. A system in accordance with claim 9 further comprising a coherent light source for providing said light source output, said focal plane containing a record medium which is linearly scanned by said coherent light source output, and collecting means optically aligned with said linear scan line locus for converting said record medium linear scan into an electronic signal, whereby a straight line spinner scanner is provided.

11. A system in accordance with claim 10 wherein said polygonal reflector is a six facet reflector.

12. A system in accordance with claim 10 wherein said collection means comprises fiber optic means and photomultiplier means for converting said record medium linear scan into an analog signal.

13. A system in accordance with claim 8 wherein said polygonal reflector is a six facet reflector having opposed reflective faces spaced 3.03 inches apart, and at the center of the linear scan R = 28.31 inches, W = 16 inches, the facet deflection = 40° total, said spherical chordal segment one intercept point in offset 0.59 inches below the virtual center of said providing spherical surface, said virtual center being 2.84 inches from said focal plane, the center of the incident light output receiving reflective face being disposed 10.36 inches along said first optical axis from the location of the plane of said providing surface virtual center, said second optical axis being spaced 0.86 inches from said first optical axis, said first reflecting planar surface being disposed along said first optical axis at an incident offset angle of 6° between a normal to said planar reflecting surface and said first optical axis and said initial scan plane being disposed at an angle of reflection with respect to said normal equal to said incident offset angle and an angle formed by an intersection of said second optical axis and the path of reflection between said first reflecting surface and said spherical chordal segment one intercept point being 8°, said chordal segment being 1 inch long and 18 inches in diameter, all of the above values being approximate to two decimal places.

14. A system in accordance with claim 1 further comprising a coherent light source for providing said incident light source output.

15. A system in accordance with claim 14 wherein said coherent light source is a laser.

16. A system in accordance with claim 1 wherein said focal plane comprises a scannable record medium, rotation of said first reflecting planar surface causes said spot to traverse said record medium in said focal plane, said system further comprising means for moving said record medium normal to said focused spot traversing linear scan, whereby an area scan of said record medium is provided.

* * * * *